United States Patent
Kuwabara et al.

(10) Patent No.: US 8,249,322 B2
(45) Date of Patent: Aug. 21, 2012

(54) SIGNAL LINE CORRECTION METHOD AND APPARATUS

(75) Inventors: Takao Kuwabara, Kanagawa (JP); Hideyuki Yamada, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 633 days.

(21) Appl. No.: 12/458,624

(22) Filed: Jul. 17, 2009

(65) Prior Publication Data

US 2010/0014772 A1    Jan. 21, 2010

(30) Foreign Application Priority Data

Jul. 18, 2008 (JP) ................. 2008-186907

(51) Int. Cl.
*G06K 9/00* (2006.01)
(52) U.S. Cl. ........ 382/128; 382/132; 378/37; 378/98.12
(58) Field of Classification Search .......... None
See application file for complete search history.

(56) References Cited

U.S. PATENT DOCUMENTS

| | | | |
|---|---|---|---|
| 6,393,160 B1 * | 5/2002 | Edgar | 382/275 |
| 6,529,618 B1 * | 3/2003 | Ohara et al. | 382/132 |
| 6,868,138 B2 * | 3/2005 | Clinthorne et al. | 378/98.8 |
| 2005/0053306 A1 | 3/2005 | Kuwabara | |
| 2006/0132626 A1 * | 6/2006 | Sakurai | 348/246 |

* cited by examiner

*Primary Examiner* — Jason M Repko
*Assistant Examiner* — Siamak Harandi
(74) *Attorney, Agent, or Firm* — Jean C. Edwards, Esq.; Edwards Neils PLLC

(57) ABSTRACT

A method for use with a radiation image detector, including the steps of detecting a faulty signal line having a signal amount less than a predetermined threshold value based on radiation image signals read out from the detector, setting a signal line adjacent to the faulty signal line as an abnormal signal line and a signal line adjacent to the abnormal signal line and having a normal amount of signal as a reference signal line, calculating the difference between a signal read out by the abnormal signal line and a signal read out by the reference signal line as a correction amount, calculating a low frequency component correction amount by removing a high frequency component from the calculated correction amount, and performing a correction on the signal read out by the abnormal signal line by adding the calculated low frequency component correction amount to the signal.

10 Claims, 9 Drawing Sheets

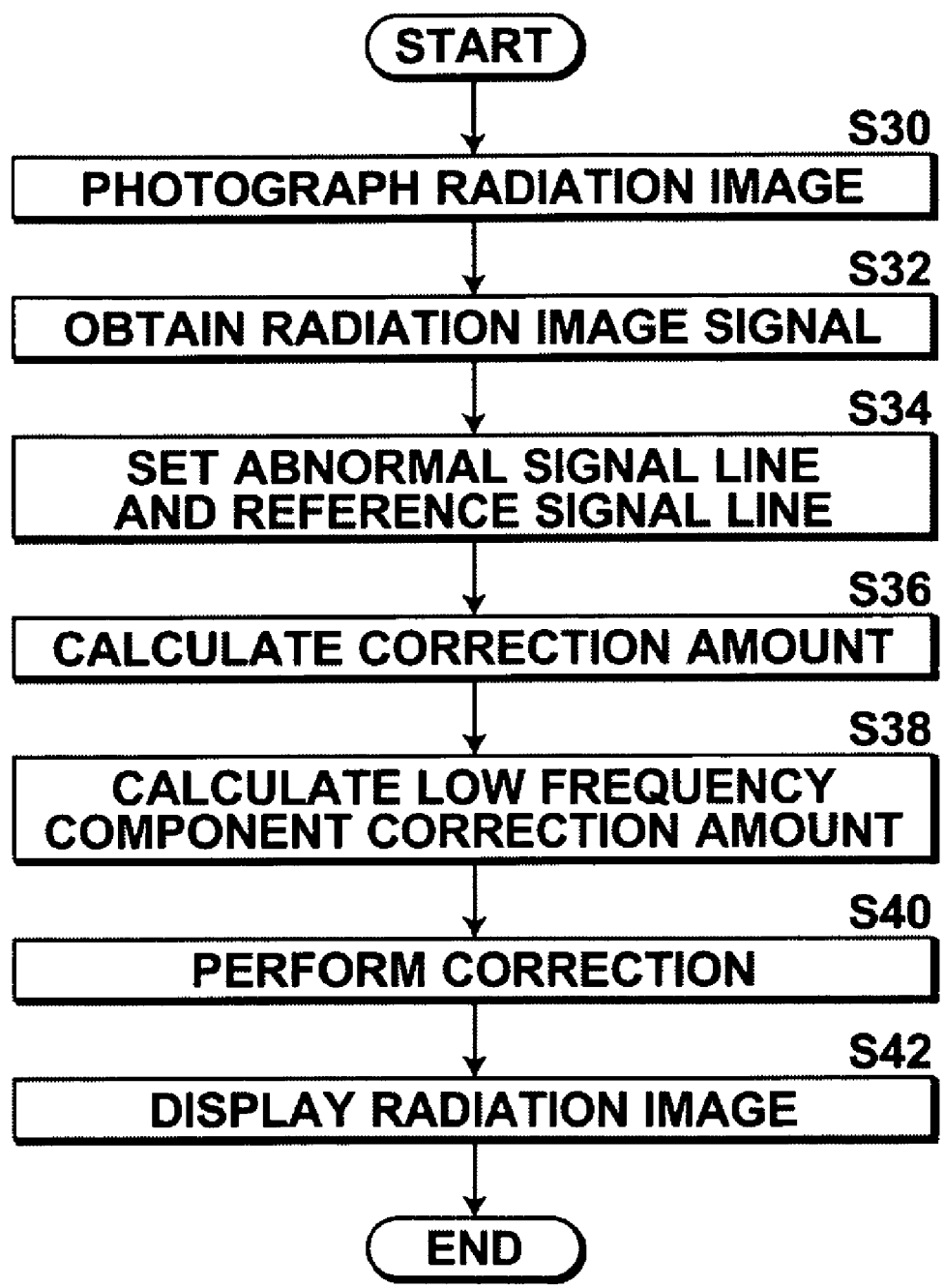

SIGNAL LINE CORRECTION METHOD AND APPARATUS

CROSS-REFERENCE TO RELATED APPLICATIONS

The present application claims priority from Japanese Patent Application No. 2008-186907, filed Jul. 18, 2008, the contents of which are herein incorporated by reference in their entirety.

BACKGROUND OF THE INVENTION

1. Field of the Invention

The present invention relates to a signal line correction method and apparatus for performing a signal line correction on a radiation image signal read out from a radiation image detector.

2. Description of the Related Art

Various types of radiation image detectors that receive radiation transmitted through a subject to record a radiation image of the subject are proposed and put into practical use in the medical and other industrial fields.

The radiation image detectors include, for example, radiation image detectors using amorphous selenium that generate charges by receiving radiation and as such radiation image detectors, a so-called optical readout type and a TFT readout type are proposed.

As for the optical readout type, for example, a radiation image detector having the following layers stacked in the order listed below is proposed: a first electrode layer that transmits radiation representing a radiation image; a recording photoconductive layer that generates charges by receiving the radiation transmitted through the first electrode layer; a charge transport layer that acts as an insulator against charges of one polarity of those generated in the recording photoconductive layer and as a conductor for charges of the other polarity; a readout photoconductive layer that generates charges by receiving readout light; and a second electrode layer that includes a transparent linear electrode that transmits the readout light and an opaque linear electrode that blocks the readout light.

As for the TFT readout type, for example, a radiation image detector having the following stacked on top of each other is proposed: an upper electrode to which a voltage is applied; a semiconductor layer that generates charges by receiving radiation; and an active matrix substrate that includes multiple of pixels, each having a storage capacitor for storing charges generated in the semiconductor layer and a TFT switch for reading out the charges stored in the storage capacitor, disposed two-dimensionally, with scanning electrodes, through which control signals for switching ON/OFF the TFT switches are transmitted, and data electrodes, through which charge signals read out from the storage capacitors via the TFT switches flow out, provided in a grid pattern.

Here, in such radiation image detectors described above, the linear electrodes or data electrodes (hereinafter, referred to as "signal lines") through which charge signals flow out may possibly have a fault, such as a breakage or the like. Such a fault poses a problem that the intensity of a signal read out by a signal line adjacent to the faulty signal line is changed due to a response delay. Further, a charge leaks from the faulty signal line to an adjacent signal line, causing a problem that the intensity of a signal read out by the adjacent signal line is changed.

The signal lines of radiation image detectors described above are connected to a readout circuit having charge amplifiers for detecting signals flowing out to the respective signal lines, and the like. Then, in the readout circuit, the outputs of the charge amplifiers are sequentially switched by a multiplexer and connected to an A/D converter, whereby radiation image signals corresponding to the respective signal lines are sequentially read out.

There has also been a problem, however, that the intensity of a signal read out by a first target signal line in the readout circuit is changed due to a response delay.

Heretofore, when such a signal line fault as described above occurs, a signal read out from an abnormal signal line adjacent to the faulty signal line has been corrected by performing interpolation using a signal read out by a normal signal line adjacent to the faulty signal line as described, for example, in U.S. Patent Application Publication No. 20060132626.

Performance of the interpolation using the signal read out by the normal signal line adjacent to the faulty signal line, however, causes information of the signal read out by the abnormal signal line to be lost completely. In fact, the signal read out by the abnormal signal line is abnormal only in density, i.e., in a low frequency component and not in a high frequency component.

Further, for the signal read out by the first target signal line of the readout circuit, performance of interpolation using a signal of an adjacent signal line causes the same problem as described above.

In view of the circumstances described above, it is an object of the present invention to provide a signal line correction method and apparatus capable of reducing information loss of a radiation image.

SUMMARY OF THE INVENTION

A first signal line correction method of the present invention is a method for use with a radiation image detector, which generates charges by receiving radiation and records a radiation image by storing the charges, having multiple signal lines and radiation image signals corresponding to the charges are read out by the multiple signal lines, the method including the steps of:

detecting a faulty signal line by threshold judgment based on the radiation image signals read out from the radiation image detector;

setting a signal line adjacent to the faulty signal line as an abnormal signal line and setting a signal line adjacent to the abnormal signal line and having a normal amount of signal as a reference signal line;

calculating the difference between a signal read out by the abnormal signal line and a signal read out by the reference signal line as a correction amount;

calculating a low frequency component correction amount by removing a high frequency component from the calculated correction amount; and performing a correction on the signal read out by the abnormal signal line by adding the calculated low frequency component correction amount to the signal.

In the first signal line correction method, the correction may be performed before correcting the signal read out by the faulty signal line.

A second signal line correction method of the present invention is a method for use with a radiation image detector, which generates charges by receiving radiation and records a radiation image by storing the charges, having multiple signal lines and signals corresponding to the charges flowing out to the multiple signal lines are read out by a readout circuit as radiation image signals to perform a correction on a radiation image signal read out from an abnormal signal line of those read out from the radiation image detector, the method including the steps of:

setting a readout start signal line which is a first readout target of the readout circuit as the abnormal signal line and setting a signal line adjacent to the abnormal signal line and having a normal amount of signal as a reference signal line;

calculating the difference between a signal read out by the abnormal signal line and a signal read out by the reference signal line as a correction amount;

calculating a low frequency component correction amount by removing a high frequency component from the calculated correction amount; and performing a correction on the signal read out by the abnormal signal line by adding the calculated low frequency component correction amount to the signal.

In the first and second signal line correction methods, after the correction, processing for removing a streak extending in a direction parallel to the signal lines may be performed on the corrected signal.

A first signal line correction apparatus of the present invention is an apparatus for use with a radiation image detector, which generates charges by receiving radiation and records a radiation image by storing the charges, having multiple signal lines and radiation image signals corresponding to the charges are read out by the multiple signal lines, the apparatus including:

a faulty signal line detection unit for detecting a faulty signal line by threshold judgment based on the radiation image signals read out from the radiation image detector;

an abnormal signal line setting unit for setting a signal line adjacent to the faulty signal line detected by the faulty signal line detection unit as an abnormal signal line;

a reference signal line setting unit for setting a signal line adjacent to the faulty signal line and having a normal amount of signal as a reference signal line;

a correction amount calculation unit for calculating the difference between a signal read out by the abnormal signal line and a signal read out by the reference signal line as a correction amount;

a low frequency component correction amount calculation unit for calculating a low frequency component correction amount by removing a high frequency component from the correction amount calculated by the correction amount calculation unit; and a correction unit for performing a correction on the signal read out by the abnormal signal line by adding the low frequency component correction amount calculated by the low frequency component correction amount calculation unit to the signal.

In the first signal line correction apparatus, the correction unit may be a unit that performs the correction before correcting the signal read out by the faulty signal line.

A second signal line correction apparatus of the present invention is an apparatus for use with a radiation image detector, which generates charges by receiving radiation and records a radiation image by storing the charges, having multiple signal lines and signals corresponding to the charges flowing out to the multiple signal lines are read out by a readout circuit as radiation image signals to perform a correction on a radiation image signal read out from an abnormal signal line of those read out from the radiation image detector, the apparatus including:

an abnormal signal line setting unit for setting a readout start signal line which is a first readout target of the readout circuit as the abnormal signal line;

a reference signal line setting unit for setting a signal line adjacent to the abnormal signal line and having a normal amount of signal as a reference signal line;

a correction amount calculation unit for calculating the difference between a signal read out by the abnormal signal line and a signal read out by the reference signal line as a correction amount;

a low frequency component correction amount calculation unit for calculating a low frequency component correction amount by removing a high frequency component from the correction amount calculated by the correction amount calculation unit; and a correction unit for performing a correction on the signal read out by the abnormal signal line by adding the low frequency component correction amount calculated by the low frequency component correction amount calculation unit to the signal.

In the first and second signal line correction apparatuses, the correction unit may be a unit that performs, after the correction, processing on the corrected signal for removing a streak extending in a direction parallel to the signal lines.

According to the first signal line correction method and apparatus, a faulty signal line is detected by threshold judgment of signal amount, a signal line adjacent to the faulty signal line is set as an abnormal signal line and a signal line adjacent to the abnormal signal line and having a normal amount of signal is set as a reference signal line, the difference between a signal read out by the abnormal signal line and a signal read out by the reference signal line is calculated as a correction amount, a low frequency component correction amount is calculated by removing a high frequency component from the calculated correction amount, and a correction is performed on the signal read out by the abnormal signal line by adding the calculated low frequency component correction amount to the signal. This allows the signal read out by the abnormal signal line to be corrected without losing information of a high frequency component of a radiation image.

Further, in the first signal line correction method and apparatus, if trying to correct the signal of the faulty signal line before correcting the signal of the abnormal signal line, it is necessary to use a signal of a signal line located farther away from the faulty signal line than the abnormal signal line, causing an artifact to be generated due to the position farther away from the faulty signal line. Consequently, if the correction of the signal of the abnormal signal line is performed before correcting the signal read out by the faulty signal line, the correction of the signal of the faulty signal line may be performed using the corrected signal of the abnormal signal line, whereby generation of such artifact may be prevented.

According to the second signal line correction method and apparatus, a readout start signal line which is a first readout target of the readout circuit is set as an abnormal signal line and a signal line adjacent to the abnormal signal line and having a normal amount of signal is set as a reference signal line, the difference between a signal read out by the abnormal signal line and a signal read out by the reference signal line is calculated as a correction amount, a low frequency component correction amount is calculated by removing a high frequency component from the calculated correction amount, and a correction is performed on the signal read out by the abnormal signal line by adding the calculated low frequency component correction amount to the signal. This allows the signal read out by the abnormal signal line to be corrected without losing information of a high frequency component of a radiation image.

Further, in the first and second signal line correction methods and apparatuses, after the correction, if processing for removing a streak extending in a direction parallel to the signal lines is performed on the corrected signal, a correction residual error may also be removed, so that a radiation image signal more appropriately representing information of a radiation image may be obtained. The term "correction residual error" as used herein refers to the difference between radiation image signals of the reference signal line and abnormal signal line due to the positional difference between them.

BRIEF DESCRIPTION OF THE DRAWINGS

FIG. 11 is a flowchart illustrating an operation of the breast image photographing/display system incorporating the second embodiment of the signal line correction apparatus of the present invention.

DESCRIPTION OF THE PREFERRED EMBODIMENTS

Figure 1:
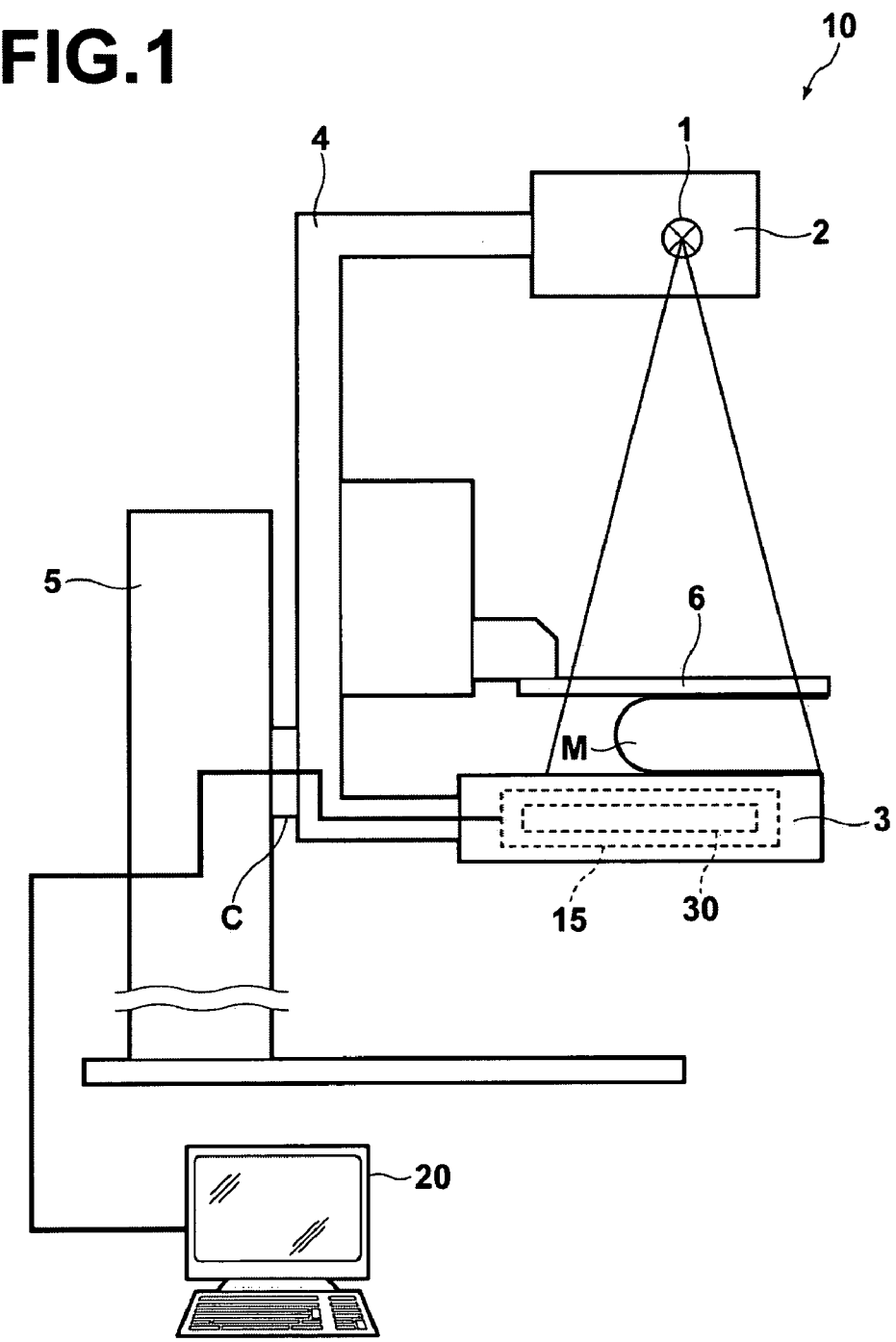
FIG. 1 is a view of a breast image photographing/display system incorporating a first embodiment of the signal line correction apparatus of the present invention, illustrating a schematic configuration thereof.

Hereinafter, a breast image photographing/display system incorporating a first embodiment of the signal line correction apparatus of the present invention will be described with reference to the accompanying drawings. The breast image photographing/display system has characteristic features in the fault correction method of linear electrodes in a radiation image detector of the system, but the schematic configuration of the entire system will be described first. FIG. 1 illustrates a schematic configuration of the breast image photographing/display system.

The breast image photographing/display system according to the present embodiment includes breast image photographing machine 10 for photographing a breast radiation image and breast image display unit 20 for displaying a breast radiation image based on radiation image data representing the breast radiation image taken by breast image photographing machine 10.

Breast image photographing machine 10 includes radiation emission unit 2 having therein radiation source 1, photographing platform 3 on which a photographing subject, breast M, is placed, and arm 4 rotatably attached to base 5 by shaft C with radiation emission unit 2 and photographing platform 3 attached at end portions thereof so as to face with each other. Pressing plate 6 for compressing breast M placed on photographing platform 3 is attached to arm 4.

Cassette 15 encasing radiation image detector 30 is placed inside of photographing platform 3. Cassette 15 further includes a readout light source for emitting readout light to radiation image detector 30, to be described later, and a moving mechanism for moving the readout light source.

Figure 3:
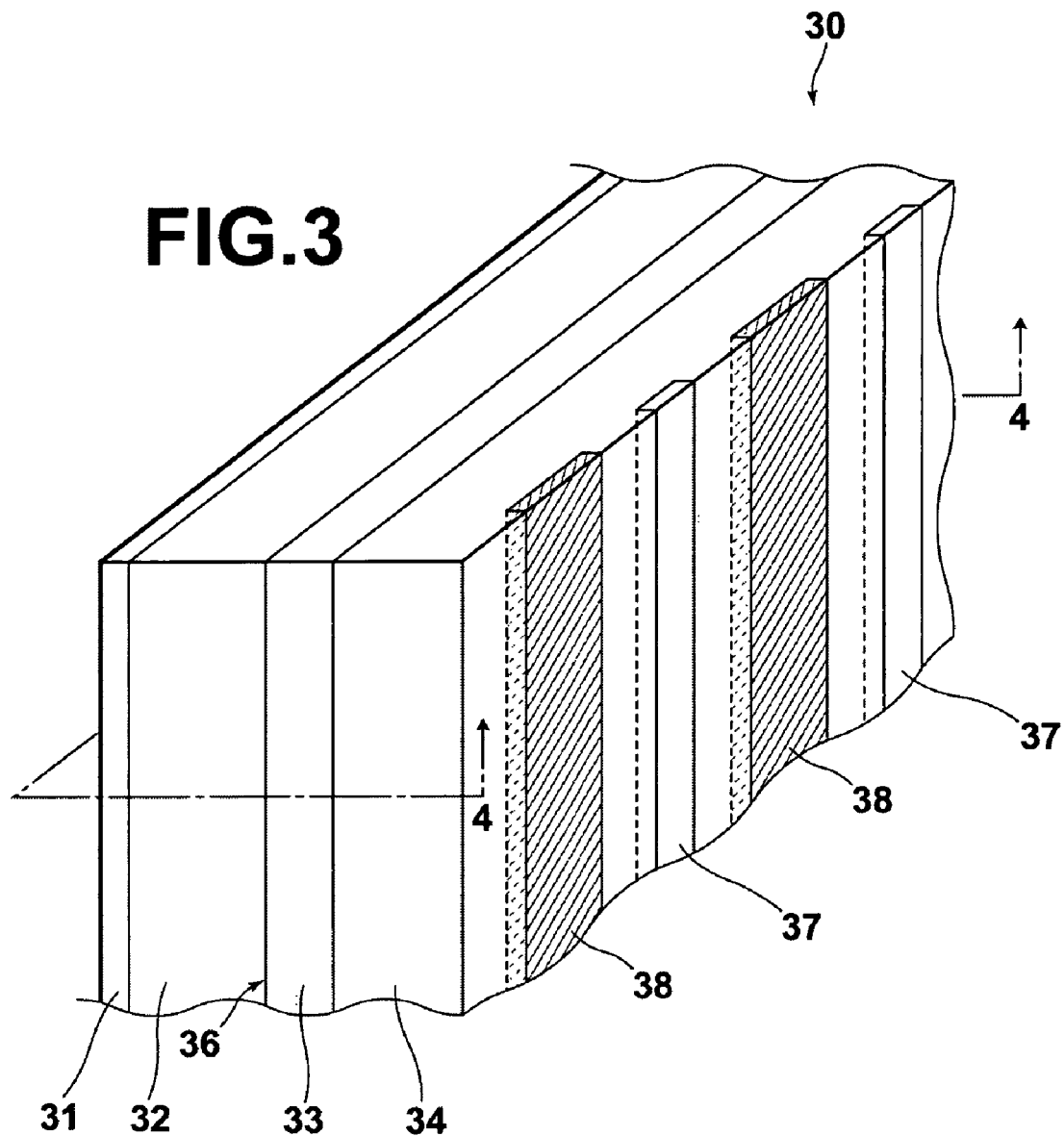
FIG. 3 is a perspective view of the radiation image detector of the breast image photographing/display system shown in FIG. 1, illustrating a schematic configuration thereof.

As for radiation image detector 30, for example, either of a so-called direct conversion type or an indirect conversion type may be used from the view point of recording mode. From the viewpoint of readout mode, either of a so-called optical readout type or a TFT readout type may be used. In the present embodiment, it is assumed that a direct conversion/optical readout type radiation image detector is used. FIG. 3 is a perspective view of radiation image detector 30 in the present embodiment, and FIG. 4 is a cross-sectional view of the radiation image detector shown in FIG. 3 taken along the line 4-4.

Figure 4:
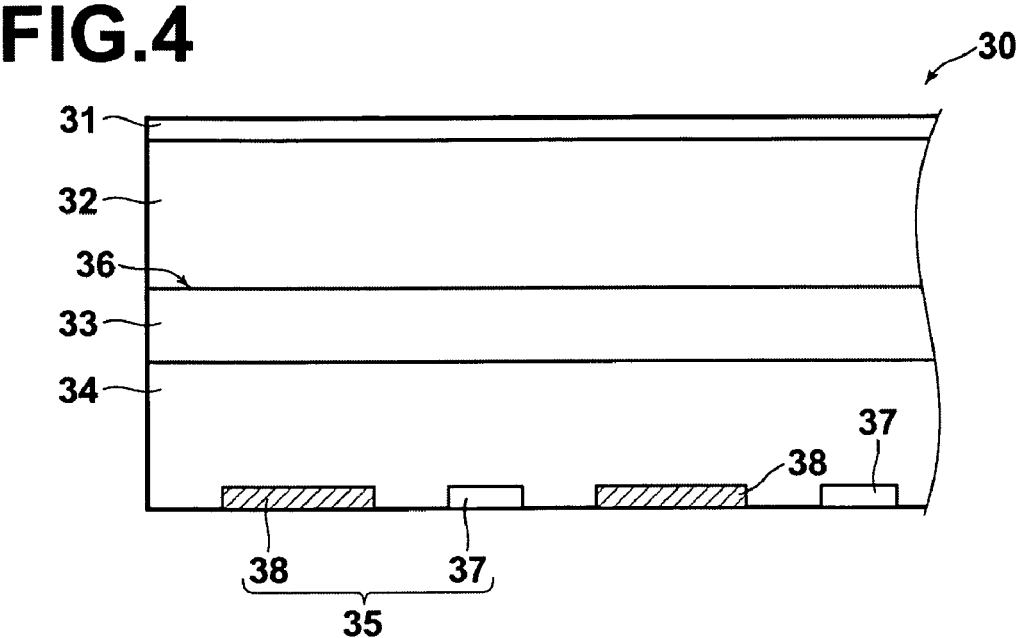
FIG. 4 is a cross-sectional view of the radiation image detector shown in FIG. 3 taken along the line 4-4.

As shown in FIGS. 3 and 4, radiation image detector 30 includes the following layers stacked in the order listed below: first electrode layer 31 that transmits radiation representing a radiation image; recording photoconductive layer 32 that generates charges by receiving the radiation transmitted through first electrode layer 31; charge transport layer 33 that acts as an insulator against charges of one polarity of those generated in the recording photoconductive layer 32 and as a conductor for charges of the other polarity; readout photoconductive layer 34 that generates charges by receiving readout light; and second electrode layer 35 having a plurality of transparent linear electrodes 37 that transmits the readout light and a plurality of opaque linear electrodes 38 that blocks the readout light disposed alternately in parallel with each other at a predetermined spacing. Storage section 36 is formed adjacent to the interface between recording photoconductive layer 32 and charge transport layer 33. Note that the respective layers described above are serially formed on a glass substrate from second electrode layer 35, but the substrate is omitted in FIGS. 3 and 4. Further, the respective layers may be formed of known materials so that they will not be elaborated upon further here.

Figure 5:
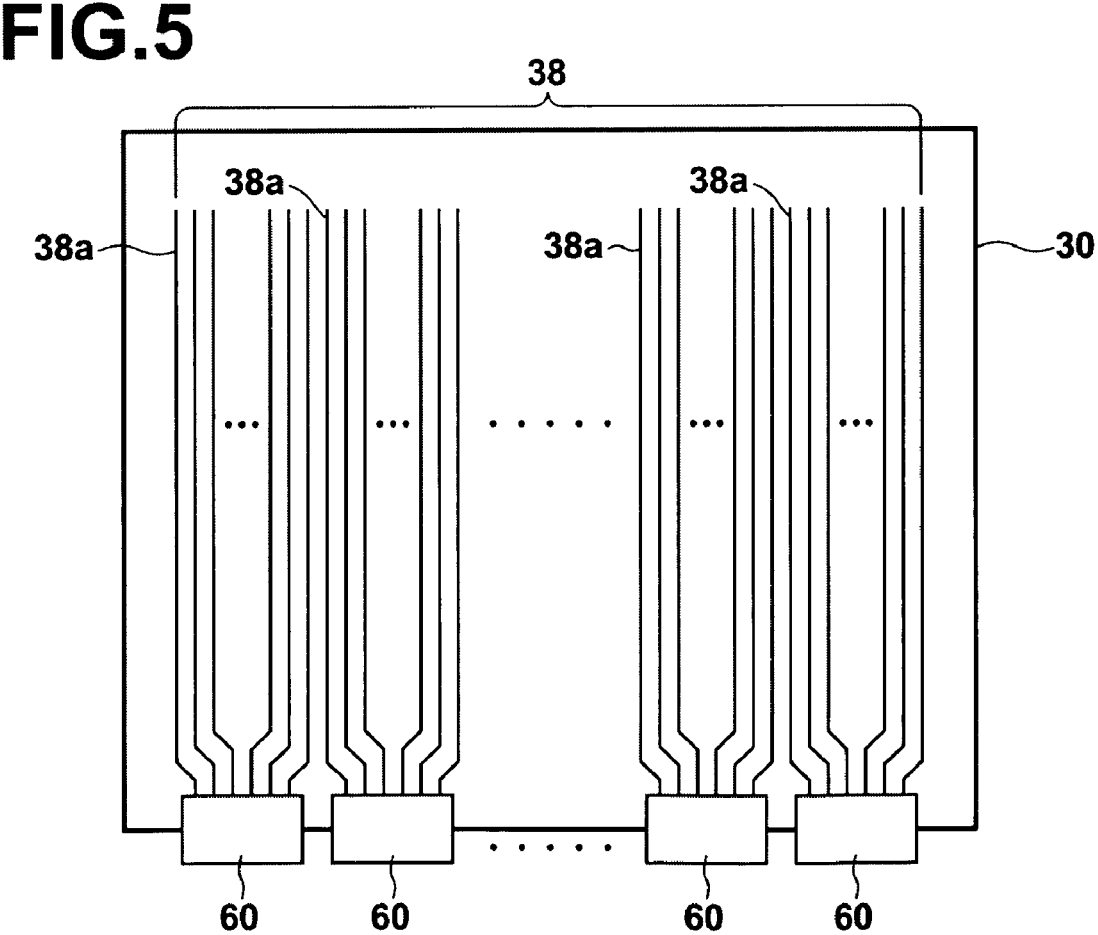
FIG. 5 illustrates opaque linear electrodes in the second electrode layer and a readout circuit of the radiation image detector shown in FIG. 3.

FIG. 5 illustrates radiation image detector 30 viewed from the side of second electrode layer 35. Note that transparent linear electrodes 37 are omitted in FIG. 5. As shown in FIG. 5, multiple readout circuits 60 for reading out signals flowing out to opaque linear electrodes 38 of radiation image detector 30 are disposed at an end portion of radiation image detector 30. Each readout circuit 60 has 256 opaque linear electrodes 38 connected thereto.

Figure 6:
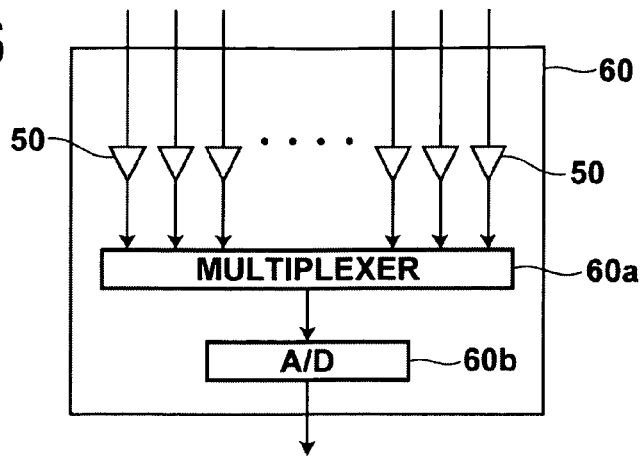
FIG. 6 illustrates a schematic configuration of the readout circuit shown in FIG. 5.

As illustrated in FIG. 6, readout circuit 60 is an IC having multiple charge amplifiers 50 for detecting signals flowing out to opaque linear electrodes 38, multiplexer 60a, and A/D converter 60b. A signal flowing out to each opaque linear electrode 38 is detected by each charge amplifier 50 connected to each opaque linear electrode 38, and the radiation image signal corresponding to each opaque linear electrode 38 is sequentially read out by sequentially switching and connecting the output of each charge amplifier 50 to A/D converter 60b in the latter stage by multiplexer 60a.

An operation for recording a radiation image in radiation image detector 30 and an operation of reading out a radiation image from radiation image detector 30 will now be described.

Figure 7A:
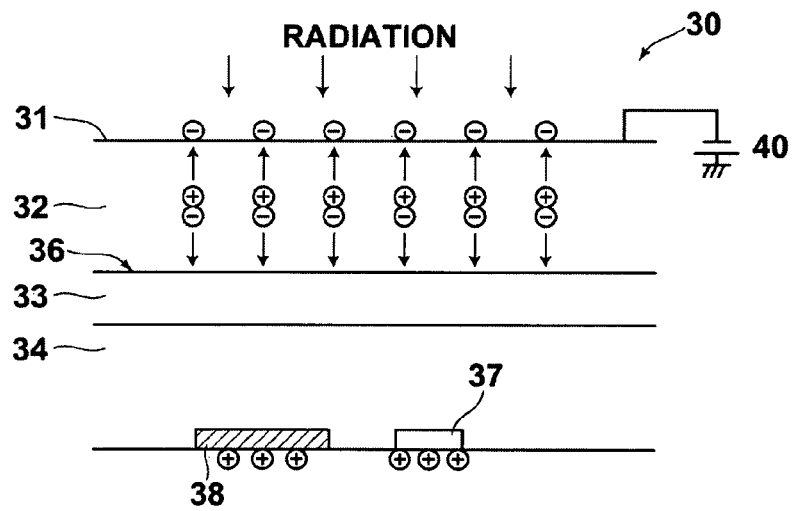
FIGS. 7A and 7B illustrate an operation for recording a radiation image in the radiation image detector shown in FIG. 3.

First, as shown in FIG. 7A, under a state in which a negative voltage is applied to first electrode layer 31 of radiation image detector 30 by high voltage power source 40, radiation transmitted through a subject and representing a radiation image of the subject is emitted on radiation image detector 30 from the side of first electrode layer 31.

Figure 7B:
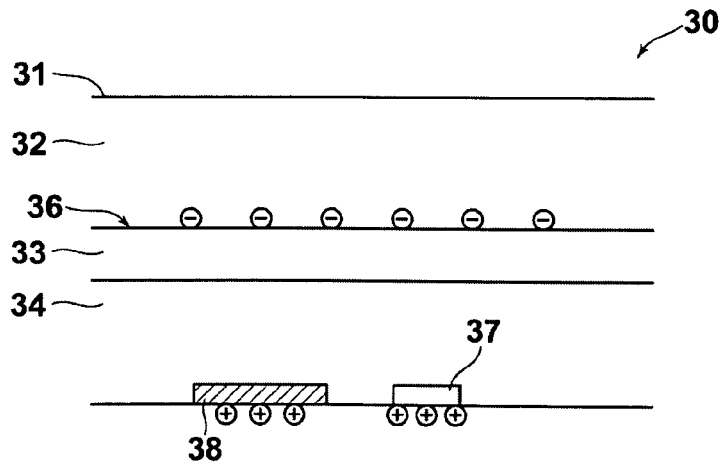

The radiation emitted on radiation image detector 30 transmits through first electrode layer 31 and emitted on recording photoconductive layer 32. Then, charge pairs are generated in recording photoconductive layer 32 by the emission of the radiation, and positive charges of the pairs are combined with negative charges charged on first electrode layer 31 and disappear, while negative charges of the pairs are stored in storage section formed at the interface between recording photoconductive layer 32 and charge transport layer 33 as latent image charges, whereby a radiation image is recorded in radiation image detector 30 (FIG. 7B).

Figure 8:
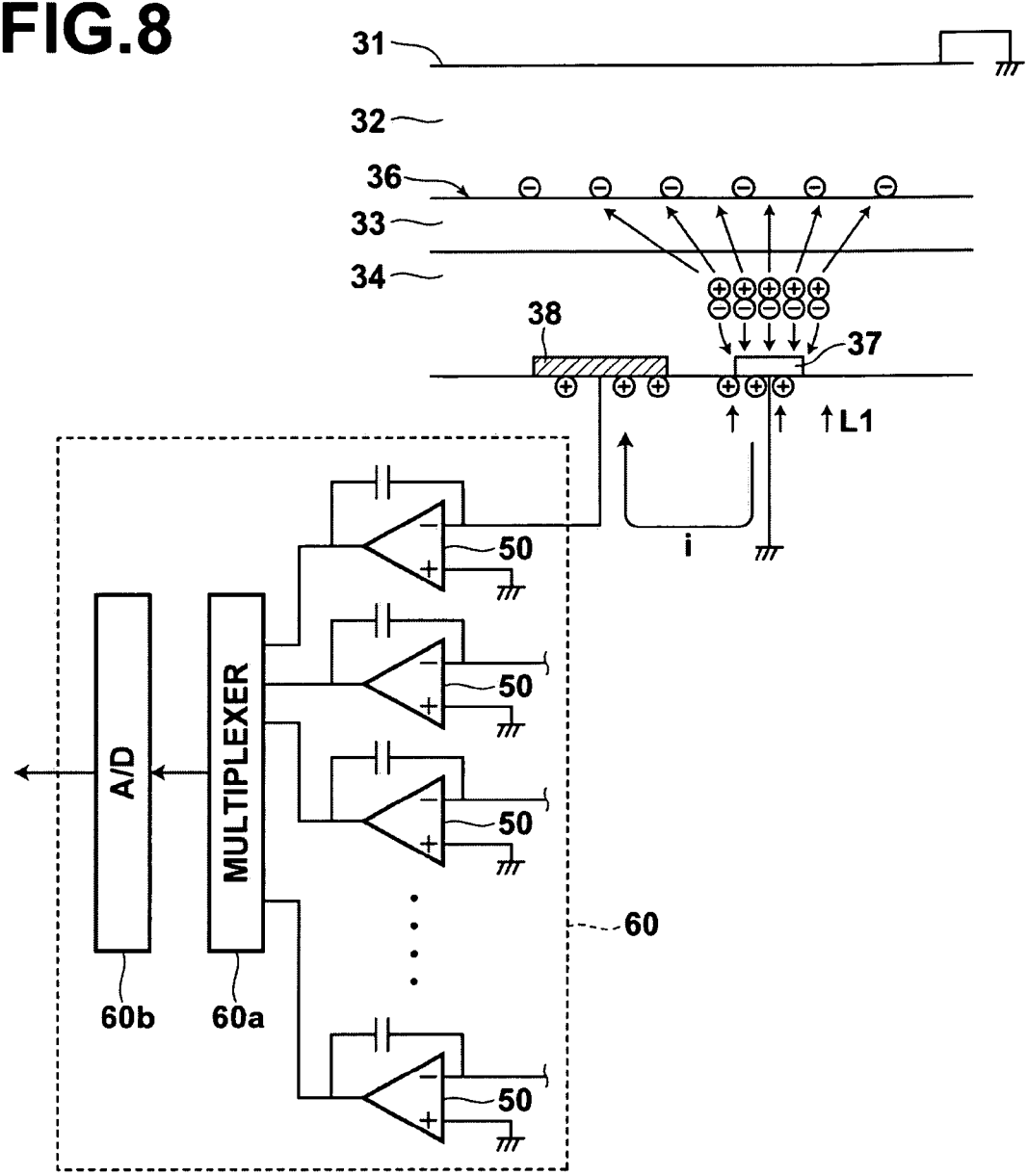
FIG. 8 illustrates an operation for reading out a radiation image from the radiation image detector shown in FIG. 3.

Thereafter, as shown in FIG. 8, under a state in which first electrode layer 31 is grounded, a linear readout light (not shown) is scanned to emit linear readout light L1 on radiation image detector 30 from the side of second electrode layer 35, and linear readout light L1 transmits through transparent linear electrodes 37 and is emitted on readout photoconductive layer 34. Positive charges generated in readout photoconductive layer 34 by the emission of readout light L1 combine with the latent image charges in storage section 36, while negative charges combines with positive charges charged on opaque linear electrodes 38 through charge amplifiers 50.

The combination of negative charges generated in readout photoconductive layer 34 with positive charges charged on opaque linear electrodes 38 causes currents to flow through charge amplifiers 50, and the currents are integrated and detected as radiation image signals.

Then, in each readout circuit 60, the radiation image signal corresponding to each opaque linear electrode 38 is sequentially read out by sequentially switching and connecting the output of each charge amplifier 50 to A/D converter 60b in the latter stage by multiplexer 60a.

Figure 2:
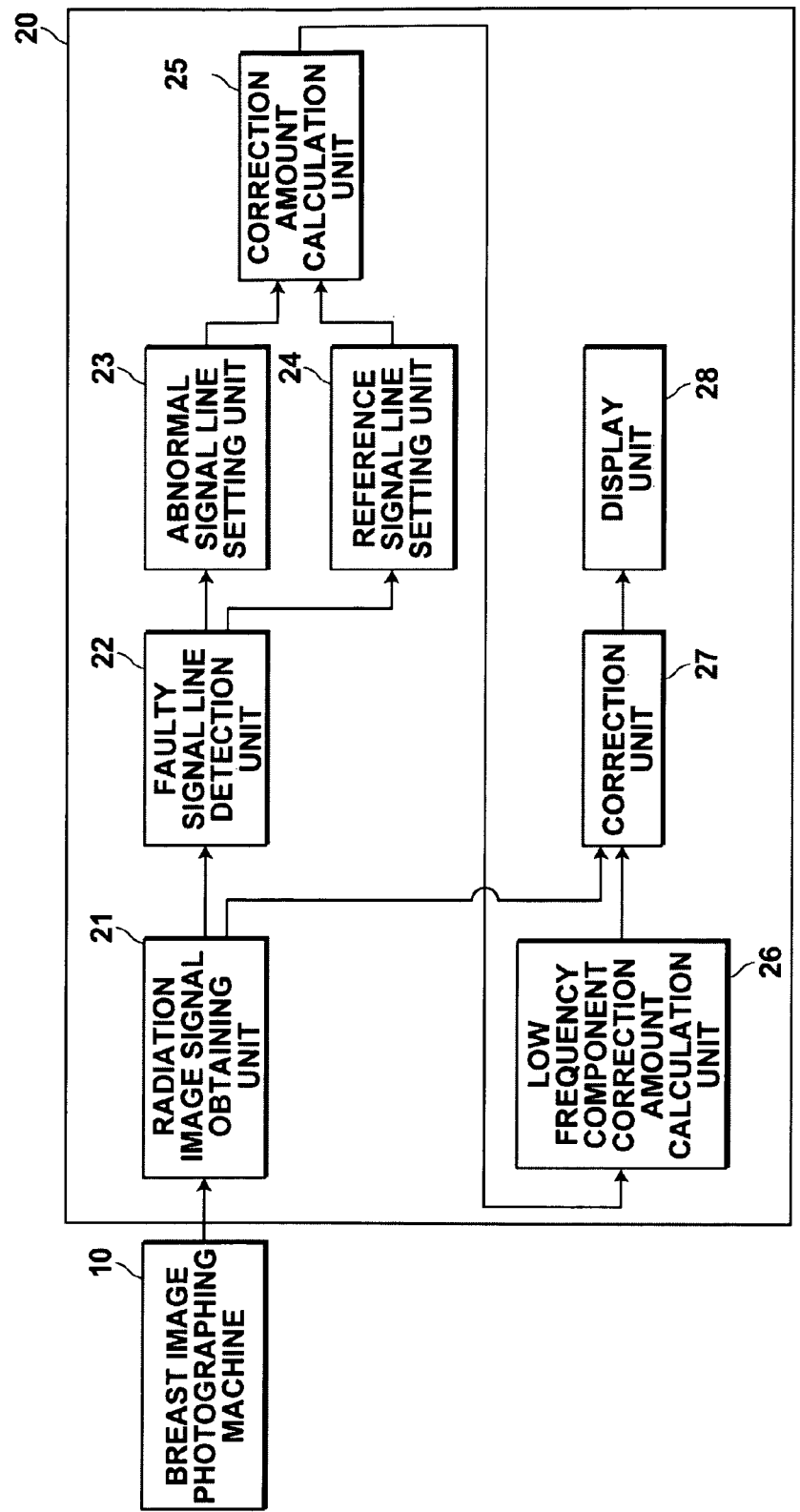
FIG. 2 is a block diagram of the breast image display unit of the breast image photographing/display system shown in FIG. 1, illustrating a schematic configuration thereof.

As shown in FIG. 2, breast image display unit 20 includes radiation image signal obtaining unit 21 for obtaining a radiation image signal read out from radiation image detector 30 of breast image photographing machine 10, faulty signal line detection unit 22 for detecting a faulty signal line (hereinafter, a pair of adjacent transparent linear electrode 37 and opaque linear electrode 38 is referred to as "signal line") based on the radiation image signal obtained by radiation image signal obtaining unit 21, abnormal signal line setting unit 23 for setting a signal line adjacent to the faulty signal line detected by faulty signal line detection unit 22 as an abnormal signal line, and reference signal line setting unit 24 for setting a signal line adjacent to the abnormal signal line set by abnormal signal line setting unit 23 and having a normal amount of signal as a reference signal line. Breast image display unit 20 further includes correction amount calculation unit 25 for calculating the difference between a signal read out by the abnormal signal line set by abnormal signal line setting unit 23 and a signal read out by the reference signal line set by reference signal line setting unit 24 as a correction amount, low frequency component correction amount calculation unit 26 for calculating a low frequency component correction amount by removing a high frequency component from the correction amount calculated by the correction amount calculation unit 25, correction unit 27 for performing a correction by adding the low frequency component correction amount calculated by low frequency component correction amount calculation unit 26 to the signal read out by the abnormal signal line, and display unit 28 for displaying a radiation image based on the radiation image signal corrected by correction unit 27. Although not shown in FIG. 2, breast image display unit 20 further includes a control unit for performing overall system control by outputting control signals to breast image photographing machine 10 and the respective units described above.

Radiation image signal obtaining unit 21 has a memory for storing a radiation image signal; it stores an inputted radiation image in the memory and outputs the radiation image signal stored in the memory to faulty signal line detection unit 22, correction unit 27, and the like.

Faulty Signal line detection unit 22 analyzes the inputted radiation image signal and sets a certain signal line as the faulty signal line by threshold judgment on the amount of readout signal. In the present embodiment, a pair of transparent linear electrode and opaque electrode is referred to as a signal line as described above, and faulty signal line detection unit 22 sets a certain signal line as the faulty signal line if either one of the transparent linear electrode and opaque linear electrode is faulty. The threshold judgment may be made such that a signal line with a signal amount less than a predetermined threshold value is determined as the faulty signal line, a signal line with a signal amount greater than a predetermined threshold value is determined as the faulty signal line, or a signal line with a signal amount outside of a predetermined range is determined as the faulty signal line.

Abnormal signal line setting unit 23 sets two pairs of signal lines immediately adjacent on each side of the faulty signal line detected by faulty signal line detection unit 22, i.e., four pairs of signal lines in total as abnormal signal lines.

Reference signal line setting unit 24 analyzes the inputted radiation image signal and sets a signal line with an amount of readout signal greater than a predetermined threshold value of those adjacent to the faulty signal line detected by faulty signal line detection unit 22 as the reference signal line.

Low frequency component correction amount calculation unit 26 performs median filtering on the correction amount calculated by correction amount calculation unit 25 to remove a high frequency component from frequency components in the correction amount, thereby calculating a low frequency component correction amount including a low frequency component of the correction amount.

Display unit 28 has a monitor and displays an entirety of a radiation image including a breast radiation image on the monitor.

Figure 9:
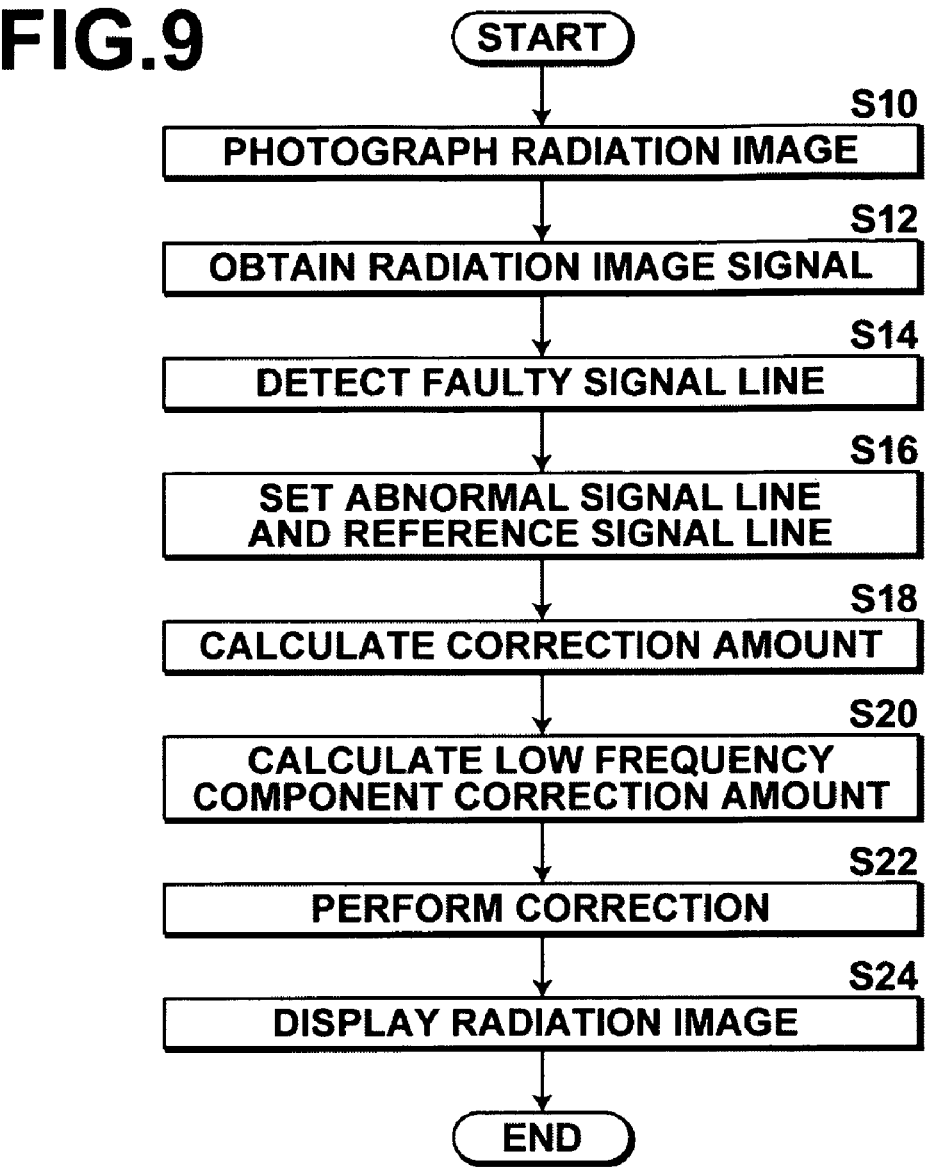
FIG. 9 is a flowchart illustrating an operation of the breast image photographing/display system shown in FIG. 1.

An operation of the breast image photographing/display system of the present embodiment will now be described with reference to FIGS. 1 to 8 and the flowchart shown in FIG. 9.

When a person under examination stands on the side of the breast image photographing machine 10, photographing platform 3 is moved to a height according to the height of the person, and arm 4 is rotated according to the photographing direction of the breast of the person. Then, after the breast of the person is placed on photographing platform 3, pressing plate 6 is moved to cause the breast to become an appropriate thickness for photographing.

Then, after the compression of the breast is completed, radiation is emitted from radiation source 1 of radiation emission unit 2 and the breast is exposed to the radiation. Then, radiation transmitted through the breast of the person under examination is emitted on cassette 15 and a radiation image of the breast is recorded in radiation image detector 30 in cassette 15, whereby photographing of a radiation image is completed (S10).

Next, a radiation image signal representing the breast radiation image recorded in radiation image detector 30 is read out and outputted to breast image display unit 20, where the signal is obtained by radiation image signal obtaining unit 21 and stored in the memory of radiation image signal obtaining unit 21 (S12).

The radiation image signal obtained by radiation image signal obtaining unit 21 is outputted to faulty signal line detection unit 22. Then, faulty signal line detection unit 22 analyzes the inputted radiation image signal and sets a signal line having an amount of readout signal less than a predetermined threshold value as the faulty signal line (S14).

Information of the faulty signal line detected by faulty signal line detection unit 22 is outputted to abnormal signal line setting unit 23. Abnormal signal line setting unit 23 sets two pairs of signal lines immediately adjacent on each side of the faulty signal line detected by faulty signal line detection unit 22, i.e., four pairs of signal lines in total as the abnormal signal lines (S16). In the mean time, the information of the faulty signal line detected by faulty signal line detection unit 22 is also outputted to reference signal line setting unit 24. Reference signal line setting unit 24 analyzes the inputted radiation image signal and sets a signal line having a readout signal amount greater than a predetermined threshold value of those adjacent to the faulty signal line detected by faulty signal line detection unit 22 as the reference signal line (S16). In the present embodiment, as two pairs of signal lines immediately adjacent on each side of the faulty signal line detected by faulty signal line detection unit 22 as abnormal signal lines, a signal line having a readout signal amount greater than the predetermined threshold value of those excluding the abnormal signal lines is set as the reference signal line. Further, in the present embodiment, a signal line having a readout signal amount greater than a predetermined threshold value is set as the reference signal line, but a signal line sufficiently remote from the faulty signal line and is deemed not to be influenced by the faulty signal line may be set as the reference signal line.

Abnormal signal line setting unit 23 and reference signal line setting unit 24 receives a radiation image signal from time to time, and abnormal signal line setting unit 23 obtains radiation image signals read out by the abnormal signal lines and outputs the signals to correction amount calculation unit 25. In the mean time, reference signal line setting unit 24 obtains a radiation image signal read out by the reference signal line and outputs the signal to correction amount calculation unit 25.

Correction amount calculation unit 25 calculates the difference between a signal read out by the abnormal signal line and a signal read out by the reference signal line as a correction amount (S18). Note that the correction amount is calculated with respect to each abnormal signal line.

The correction amounts calculated by correction amount calculation unit 25 are outputted to low frequency component correction amount calculation unit 26. Low frequency component correction amount calculation unit 26 performs median filtering or the like on each inputted correction amount to remove a high frequency component from frequency components in each correction amount, thereby calculating a low frequency component correction amount including a low frequency component of each correction amount (S20).

Each low frequency component correction amount calculated by low frequency component correction amount calculation unit 26 is outputted to correction unit 27. Correction unit 27 performs a correction on the radiation image signal read out by each abnormal signal line by adding the low frequency component correction amount corresponding to the radiation image signal read out by each abnormal signal line to the radiation image signal read out by each abnormal signal line (S22). Further, correction unit 27 performs a correction on the radiation image signal corresponding to the faulty signal line using a radiation image signal readout by the adjacent reference signal line or a signal obtained by adding the low frequency component correction amount to the radiation image signal read out by an abnormal signal line (S22).

The radiation image signal corrected by correction unit 27 is outputted to display unit 28, and display unit 28 displays a radiation image on the monitor based on the corrected radiation image signal inputted thereto (S24).

Next, a breast image photographing/display apparatus incorporating a second embodiment of the signal line correction apparatus of the present invention will be described. The schematic configuration of the entire system is similar to that of the breast image photographing/display apparatus incorporating the first embodiment.

The breast image photographing/display apparatus incorporating the second embodiment differs from the breast image photographing/display apparatus incorporating the first embodiment in the method for setting an abnormal signal line and a reference signal line. Hereinafter, a different configuration from the breast image photographing/display apparatus incorporating the first embodiment will be described.

Figure 10:
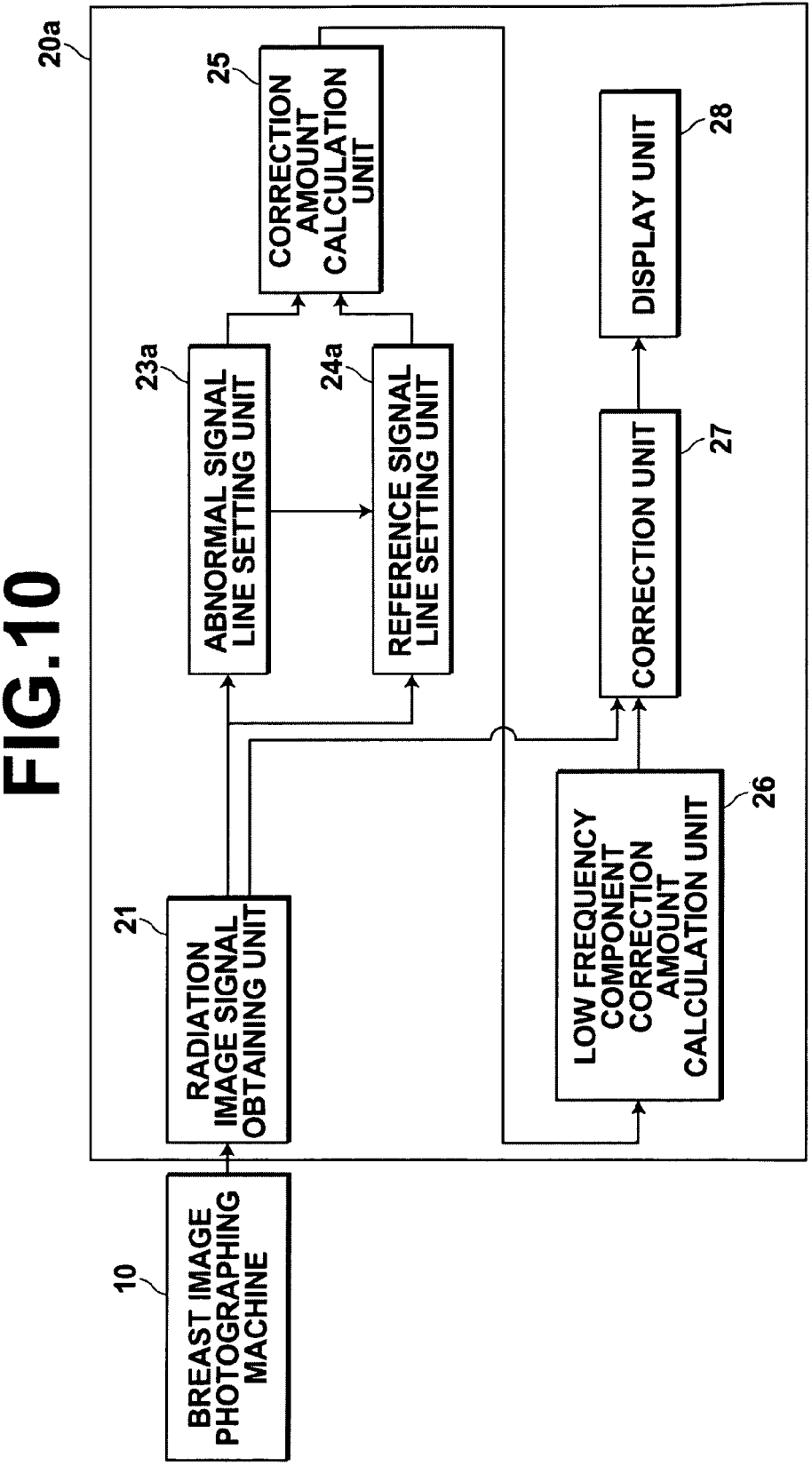
FIG. 10 is a block diagram of a breast image display unit of a breast image photographing/display system incorporating a second embodiment of the signal line correction apparatus of the present invention, illustrating a schematic configuration thereof.

A schematic configuration of breast image display unit 20a of the breast image photographing/display system incorporating the second embodiment is shown in FIG. 10. As shown in FIG. 10, breast image display unit 20a does not have faulty signal line detection unit 22 provided in breast image display unit 20 of the first embodiment.

Abnormal signal line setting unit 23a of breast image display unit 20a of the second embodiment sets signal line 38a which is the first readout target of each readout circuit 60 shown in FIG. 5 as an abnormal signal line. Here, signal line 38a which is the first readout target of each readout circuit 60 refers to the signal line connected to charge amplifier 50 which will be connected to A/D converter 60b first by multiplexer 60a.

Reference signal line setting unit 24a of breast image display unit 20a of the second embodiment sets a signal line adjacent to the abnormal signal line set by abnormal signal line setting unit 23a and having a normal amount of signal as a reference signal line.

An operation of the breast image photographing/display system of the present embodiment will now be described with reference to FIG. 10 and the flowchart shown in FIG. 11.

After photographing of a radiation image is performed, a radiation image signal representing a breast radiation image recorded in radiation image detector 30 is read out and outputted to breast image display unit 20a, where the signal is obtained by radiation image signal obtaining unit 21 and stored in the memory of radiation image signal obtaining unit 21 (S30, S32). Detailed operations in S30 and S32 are identical to those in the breast image photographing/display system of the first embodiment.

In the mean time, abnormal signal line setting unit 23a receives information of signal line 38a of the first readout target of each readout circuit 60, and sets abnormal signal lines based on the information. Then, information of abnormal signal lines set by abnormal signal line setting unit 23a is outputted to reference signal line setting unit 24a. Then, based on a radiation image signal received from time to time and the information of abnormal signal lines, reference signal line setting unit 24a sets a signal line having a readout signal amount greater than a predetermined threshold value of those adjacent to the abnormal signal lines as a reference line (S34). In the present embodiment, signal line 38a of the first readout target for each readout circuit 60 is set as the abnormal signal line, so that a signal line having a readout signal amount greater than the predetermined threshold value of those excluding the abnormal signal lines is set as a reference signal line (S34). A radiation image signal is also inputted to abnormal signal line setting unit 23a from time to time, and abnormal signal line setting unit 23a obtains radiation image signals read out by the abnormal signal lines and outputs the signals to correction amount calculation unit 25. In the mean time, reference signal line setting unit 24 obtains a radiation image signal read out by the reference signal line and outputs the signal to correction amount calculation unit 25.

Correction amount calculation unit 25 calculates the difference between a signal read out by the abnormal signal line and a signal read out by the reference signal line as a correction amount (S36). Note that the correction amount is calculated with respect to each abnormal signal line.

The correction amounts calculated by correction amount calculation unit 25 are outputted to low frequency component correction amount calculation unit 26. Low frequency component correction amount calculation unit 26 performs median filtering or the like on each inputted correction amount to remove a high frequency component from frequency components in each correction amount, thereby calculating a low frequency component correction amount including a low frequency component of each correction amount (S38).

Each low frequency component correction amount calculated by low frequency component correction amount calculation unit 26 is outputted to correction unit 27. Correction unit 27 adds the low frequency component correction amount corresponding to the radiation image signal read out by each abnormal signal line to the radiation image signal read out by each abnormal signal line, thereby correcting the radiation image signal read out by each abnormal signal line (S40).

The radiation image signal corrected by correction unit 27 is outputted to display unit 28, and display unit 28 displays a radiation image on the monitor based on the corrected radiation image signal inputted thereto (S42).

In breast image photographing/display apparatuses of the first and second embodiments, after the correction is performed by correction unit 27, processing for removing a streak extending in a direction parallel to the signal lines may be performed on the corrected signal. For example, a method described in U.S. Patent Application Publication No. 20050053306 may be used as the method for removing the streak.

In the breast image photographing/display apparatus incorporating the first or second embodiment described above, an optical readout type radiation image detector is used, but a TFT readout type radiation image detector may also be used. In that case, a data line to which a charge read out by turning ON a TFT switch flows out corresponds to a signal line of the optical readout type radiation image detector.

What is claimed is:

1. A signal line correction method for use with a radiation image detector, which generates charges by receiving radiation and records a radiation image by storing the charges, having multiple signal lines and radiation image signals corresponding to the charges are read out by the multiple signal lines, the method comprising the steps of:

detecting a faulty signal line by threshold judgment based on the radiation image signals read out from the radiation image detector;

setting a signal line adjacent to the faulty signal line as an abnormal signal line and setting a signal line adjacent to the abnormal signal line and having a normal amount of signal as a reference signal line;

calculating the difference between a signal read out by the abnormal signal line and a signal read out by the reference signal line as a correction amount;

calculating a low frequency component correction amount by removing a high frequency component from the calculated correction amount; and performing a correction on the signal read out by the abnormal signal line by adding the calculated low frequency component correction amount to the signal read out by the abnormal signal line.

2. The signal line correction method of claim 1, wherein the correction is performed before correcting the signal read out by the faulty signal line.

3. A signal line correction method for use with a radiation image detector, which generates charges by receiving radiation and records a radiation image by storing the charges, having multiple signal lines and signals corresponding to the charges flowing out to the multiple signal lines are read out by a readout circuit as radiation image signals to perform a correction on a radiation image signal read out from an abnormal signal line of those read out from the radiation image detector, the method comprising the steps of:

setting a readout start signal line which is a first readout target of the readout circuit as the abnormal signal line and setting a signal line adjacent to the abnormal signal line and having a normal amount of signal as a reference signal line;

calculating the difference between a signal read out by the abnormal signal line and a signal read out by the reference signal line as a correction amount;

calculating a low frequency component correction amount by removing a high frequency component from the calculated correction amount; and performing a correction on the signal read out by the abnormal signal line by adding the calculated low frequency component correction amount to the signal read out by the abnormal signal line.

4. The signal line correction method of claim 1, wherein, after the correction, processing for removing a streak extending in a direction parallel to the signal lines is performed on the corrected signal.

5. The signal line correction method of claim 3, wherein, after the correction, processing for removing a streak extending in a direction parallel to the signal lines is performed on the corrected signal.

6. A signal line correction apparatus for use with a radiation image detector, which generates charges by receiving radiation and records a radiation image by storing the charges, having multiple signal lines and radiation image signals corresponding to the charges are read out by the multiple signal lines, the apparatus comprising:

a faulty signal line detection unit for detecting a faulty signal line by threshold judgment based on the radiation image signals read out from the radiation image detector; an abnormal signal line setting unit for setting a signal line adjacent to the faulty signal line detected by the faulty signal line detection unit as an abnormal signal line;

a reference signal line setting unit for setting a signal line adjacent to the abnormal signal line and having a normal amount of signal as a reference signal line;

a correction amount calculation unit for calculating the difference between a signal read out by the abnormal signal line and a signal read out by the reference signal line as a correction amount;

a low frequency component correction amount calculation unit for calculating a low frequency component correction amount by removing a high frequency component from the correction amount calculated by the correction amount calculation unit; and a correction unit for performing a correction on the signal read out by the abnormal signal line by adding the low frequency component correction amount calculated by the low frequency component correction amount calculation unit to the signal read out by the abnormal signal line.

7. The signal line correction apparatus of claim 6, wherein the correction unit is a unit that performs the correction before correcting the signal read out by the faulty signal line.

8. A signal line correction apparatus for use with a radiation image detector, which generates charges by receiving radiation and records a radiation image by storing the charges, having multiple signal lines and signals corresponding to the charges flowing out to the multiple signal lines are read out by a readout circuit as radiation image signals to perform a correction on a radiation image signal read out from an abnormal signal line of those read out from the radiation image detector, the apparatus comprising:

an abnormal signal line setting unit for setting a readout start signal line which is a first readout target of the readout circuit as the abnormal signal line;

a reference signal line setting unit for setting a signal line adjacent to the abnormal signal line and having a normal amount of signal as a reference signal line;

a correction amount calculation unit for calculating the difference between a signal read out by the abnormal signal line and a signal read out by the reference signal line as a correction amount;

a low frequency component correction amount calculation unit for calculating a low frequency component correction amount by removing a high frequency component from the correction amount calculated by the correction amount calculation unit; and a correction unit for performing a correction on the signal read out by the abnormal signal line by adding the low frequency component correction amount calculated by the low frequency component correction amount calculation unit to the signal read out by the abnormal signal line.

9. The signal line correction apparatus of claim 6, wherein the correction unit is a unit that performs, after the correction, processing on the corrected signal for removing a streak extending in a direction parallel to the signal lines.

10. The signal line correction apparatus of claim 8, wherein the correction unit is a unit that performs, after the correction, processing on the corrected signal for removing a streak extending in a direction parallel to the signal lines.

* * * * *